US005266068A

United States Patent [19]

Benthin

[11] Patent Number: 5,266,068
[45] Date of Patent: Nov. 30, 1993

[54] VERTICAL BLIND WITH SINGLE-ELEMENT DRIVE

[75] Inventor: Siegfried Benthin, Bremerhaven, Fed. Rep. of Germany

[73] Assignee: Benthin Management GmbH, Brenerhaen, Fed. Rep. of Germany

[21] Appl. No.: 946,970

[22] Filed: Sep. 17, 1992

[30] Foreign Application Priority Data

Sep. 21, 1992 [DE] Fed. Rep. of Germany ....... 4131478

[51] Int. Cl.[5] ................ F16H 3/44

[52] U.S. Cl. ................ 475/301; 475/320; 160/168.1; 160/176.1

[58] Field of Search ................ 475/301, 317, 318, 320; 160/168.1, 176.1

[56] References Cited

U.S. PATENT DOCUMENTS

| | | | |
|---|---|---|---|
| 4,224,973 | 9/1980 | Hugin | 160/178 R |
| 4,657,060 | 4/1987 | Kaucic | 160/168 R |
| 4,834,163 | 5/1989 | Dickstein | 160/176.1 |
| 4,848,433 | 7/1989 | Bresson et al. | 160/178.1 |

FOREIGN PATENT DOCUMENTS

| | | |
|---|---|---|
| 2340870A1 | 3/1975 | Fed. Rep. of Germany . |
| 2554351B2 | 6/1978 | Fed. Rep. of Germany . |
| 3029179A1 | 3/1982 | Fed. Rep. of Germany . |

*Primary Examiner*—Dirk Wright
*Attorney, Agent, or Firm*—McGlew and Tuttle

[57] ABSTRACT

A vertical blind construction, including slats arranged hanging on a slat carriage each, tiltably around a vertical axis, and with a driving element (1), whose direction of movement is reversible, or a gear, which can be connected by coupling elements to an endless pull cord (6) for laterally displacing the slat carriages guided in a support rail (31), and to a grooved shaft (11), which passes through a tilting gear for tilting the slats in the slat carriages. The rotatable driving element (1) in connection with a planetary gear, wherein the driving element (1) is connected to the central gear (2), whose outer ring (4) is connected by a first recording disk idling gear (5), whose idle is adjusted to a slat tilt angle of 180°, to a drive gear (7) or the pull cord (6) and, via an intermediate gear (10) as well as a slip clutch (13), to the grooved shaft (11). The slip clutch (13) is associated with a second recording disk idling gear (12) for a slat tilt angle which likewise corresponds to 180°, which second recording disk idling gear opens, at the end of its idle running, the slip clutch (13), and the first recording disk idling gear (5) disengages, at the end of its idle running, against the action of a spring, a movably guided shifting element (17), which blocks the rotation of the drive gear (7) for the pull cord (6).

7 Claims, 1 Drawing Sheet

VERTICAL BLIND WITH SINGLE-ELEMENT DRIVE

FIELD OF THE INVENTION

The present invention pertains to a vertical blind arrangement including slats arranged hanging on a slat carriage, each slat being tiltable around a vertical axis and more particularly to a driving element for vertical blinds which driving element has a direction of movement which is reversible and which may be coupled by means of an endless pull cord for laterally displacing the slat carriages guided in the support rail and to a grooved shaft which passes through a tilting gear in the slat carriages for tilting the slats.

BACKGROUND OF THE INVENTION

Such a vertical blind, in which the lateral displacement of the slats with their slat carriage in the support rail for opening and closing the blind, as well as the pivoting or tilting of the slats around their vertical central axis can be brought about by means of a single driving element, has been known from the German Offenlegungsschrift No. DE-OS 30,29,179. This driving element consists of a bead chain, which is led out of the support rail with a loop and is coupled in the support rail in the slat carriage leading in the closing direction of the slats with a tilting plate. The slat of this slat carriage is connected by spacing means arranged between the slats to all other slats, so that all slats can be pivoted around the vertical axis for a tilting process. Thus, lateral displacement of the slats in the closing direction and in the opening direction, as well as tilting of the slats is possible via the same pull cord, but tilting movements of the slats can be performed only at the end of a displacement movement when the blind is closed.

Grooved shafts for the tilting drive of the slats around their vertical axis and slip clutches between a gear through which the grooved shaft passes and a pinion on the tilting pin of the slat have been known from West German Offenlegungsschrift No. DE-OS 23,40,870 and West German Auslegeschrift No. DE-AS 25,54,351. According to these documents, slip clutches are provided in each of the slat carriages, so that increasing force has to be applied to operate the vertical blind by the pull cord as the number of slat carriages increases.

SUMMARY AND OBJECTS OF THE INVENTION

The primary object of the present invention is to design a vertical blind with a driving element which reverses the direction of movement such that a rotary motor drive can preferably be used, and the slats are tilted around a grooved shaft passing through a tilting gear in all slat carriages by a gear concentrated at the end of the support rail.

According to the invention, a vertical blind is provided with a drive having a reversible direction of movement. The drive element is connected to a central gear of a planetary gear having an outer ring. The outer ring is connected by a first recording disk idling gear with an idle adjusted to a slat tilt angle of 180°. The first recording disk idling gear is connected to a drive gear, for a pull cord for laterally displacing the slat carriages guided in the support rail and driving element is connected to an intermediate gear and a slip clutch, to a grooved shaft. The slip clutch is associated with a second recording disk idling gear for a slat tilt angle which likewise corresponds to 180°. The second recording disk idling gear opens at the end of its idling path, the slip clutch and the first recording disk idling gear disengages at the end of its idling run, against the action of a spring. A movably guided shifting segment is provided which blocks the rotation of the drive gear for the pull cord.

The possibility of compact design of such a single-element drive especially for motor-driven driving means, whose direction of rotation is reversible, is remarkable. However, the particular advantages also include the possibility of tilting the slats in any desired position of the vertical blind by simply reversing the direction of rotation of the driving element. The planetary gear steps down high drive speeds to speeds suitable for operating the vertical blind. It permits accommodation together with the recording disk idling gear and the other transmission elements in a cross-section profile which is adapted to the cross-section profile of the support rail.

To ensure the desired course of the drive movements, the axial movement of the shifting segment is performed by a cam plate, which cooperates with the end plate at the outlet of the idling gear associated with the pull cord drive and which engages, with its edge, a recess of the shifting segment which block the pull cord drive in one axial end position and the grooved shaft drive in the other axial end position.

According to a special idea for designing the present invention, means are provided which tilt the slats first into a partially open position (by, e.g., 30°) from the closed blind position when the drive is operated. This occurs before the first slat carriage begins to push the second slat carriage due to the beginning lateral travel movement of the slat carriages with the slats arranged hanging on them for closing or opening the vertical blind. In intermediate positions of the blind or when the blind is opened, the drive acts on the grooved shaft of the tilting gear only over a tilt angle smaller than 180° via the recording disk idling gear associated with the tilting movement of the slats. Tilting movement by a tilt angle of 180° can again take place only when the slats are fully spread out for closing the blind, in which position the slats are aligned in parallel to one another. This prevents damage to the slats by slats aligned in one plane forcefully striking each other.

According to further advantageous embodiments of the invention, the slip clutch is provided as two elements which are coupled in the closing direction by a spring, positioned between the grooved shaft and the second recording disk idling gear. An opening element of the slip clutch is provided with recesses for engaging a shifting element in one of its end positions (it is movably arranged between end positions). The movably arranged shifting segment is mounted pivotably around an axis to abolish a coupling function and can be actuated by axial movement of a shifting segment, which cooperates with an axial cam at an end plate of the recording disk idling gear (first recording disk idling gear) which is associated with the pull cord drive and with an axially displaceable disk. Means are provided which block the rotation of the grooved shaft 11 for a tilting movement of the slats over an angle (of about 30°) on both sides of the extended flat plane outside the closed blind position or which bring about tilting back into the area when the closed blind position has been left. Means for limiting the tilt angle preferably consists of a catch blocking a recording disk and a ratchet or the like. The pull cord is provided with thickenings or thickened regions which act against a spring-tension slide. This slide then acts through the transmission means on the catch mechanism of the ratchet. The pull cord carries no thickenings in an area which acts on the slide when the blind is closed so that the slide releases the ratchet in the closed position of the blind and the ratchet releases the recording disk of the second recording disk idling gear associated with the groove shaft in order to make a 180° tilting of the slats in this position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figures 1, 2, 3, 4, 5, 6:
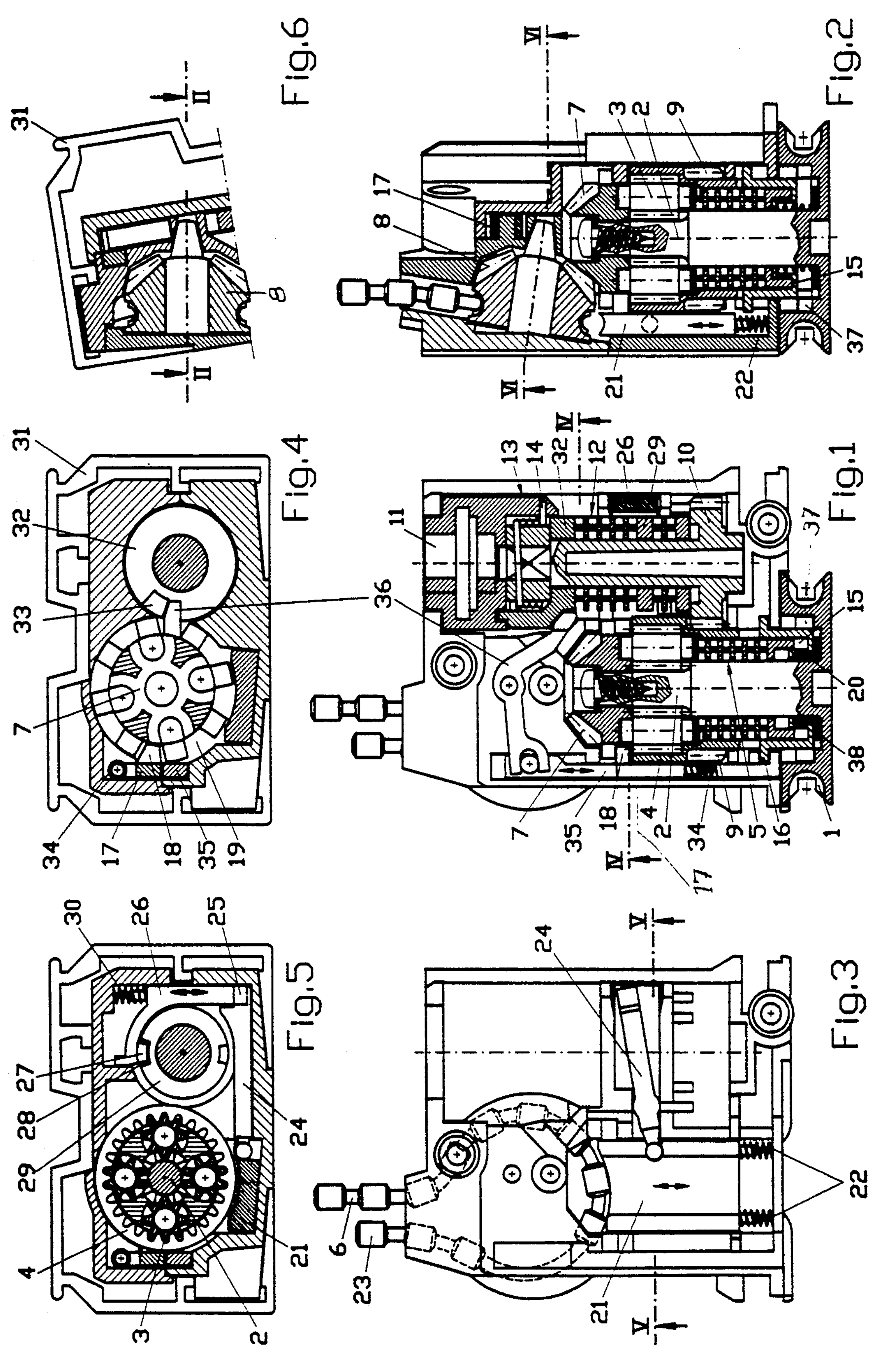
FIG. 1 is a horizontal sectional view through a blind drive with one driving element.
FIG. 2 is a sectional view rotated by approximately 90° in relation to FIG. 1 in a plane according to line II—II in FIG. 6, which plane is inclined relative to the vertical direction.
FIG. 3 is a top view of parts of the drive below the recording disk idling gear in FIG. 1.
FIG. 4 is a sectional view according to line IV—IV in FIG. 1.
FIG. 5 is a section according to line V—V in FIG. 3.
FIG. 6 is a partial section according to line VI—VI in FIG. 2, which section is placed into the section plane.

The drawing shows an embodiment in which a rotatable driving element 1 is arranged coaxially with the central gear 2 of a planetary gear with the planet gears 3, whose teeth mesh with the internal teeth of an outer ring 4. A first recording disk gear 5 is associated with the drive of the pull cord 6 for the lateral displacement of the slats with their slat carriages 6 in a support rail 31 via the bevel gear pair 7, 8, of which one bevel gear 7 is mounted coaxially with the central gear 2 of the planetary gear. Via outer teeth 9 on the outer ring 4 and a gear 10 meshing with these outer teeth 9, the planetary gear can be connected to a grooved shaft 11, which passes axially movably through a drive gear of a tilting gear in each slat carriage for tilting the slats around their vertical axes. With this drive of the grooved shaft 11 is associated a second recording disk idling gear 12, one end plate of which is connected to the housing, and the other end plate of which is connected to an opening element 32 of a slip clutch 13, whose driving element and whose driven element are held together by a spring 14 by frictional connection in the known manner. In the case of the example shown, both recording disk idling clutches 5 and 12 are designed to perform six revolutions for a 180° tilt angle of the slats. The end plate of the recording disk idling gear 5 located on the torque input side is rigidly connected to an axial cam 15, which acts against an axially displaceably, but nonrotatably arranged disk 16, which engages the axially movably guided shifting segments 35 and 17. The shifting segment 17 is pushed by the spring 34 with the ratchet 18 into a recess 19, several of which are arranged on the circumference of the bevel gear 7, as a result of which it blocks the rotary movement of the bevel gear 7. The disk 16, which is nonrotatably connected to the outer ring 4 but is axially displaceably, pulls the ratchet 18 out of the recess 19 in order to release the bevel gear 7, as is shown in FIG. 1, only after rundown of the recording disk idling gear 5. Due to the axial displacement of the disk 16, stops on the disk 16 come to lie against stops 37 in the driving element 1, as a result of which the outer ring 4 will be nonrotatably connected to the driving element 1. Since the shifting segment 17 is supported by the disk 16 on one side only, the disk 16 is pushed back by the spring 20 on reversal of the direction of rotation even if the ratchet 18 of the shifting segment 17 has not yet located the recess 19 of the bevel gear 7. Due to the axial movement of the disk 16 in the direction of the driving element 1, the shifting segment 35 is pushed at the same time in the same direction, as a result of which a shifting segment 36 is pivoted into the range of rotation of the opening element 32 of the slip clutch 13.

Turning back is achieved by a stop cam 33 on the disk-like or sleeve-like opening element 32 of the slip clutch 13 before a lateral displacing movement of the slats from the closed position is possible. The direction of rotation is reversed in the case of rigid connection between the driving element 1 and the bevel gear 7 at the end of the six idle revolutions of the recording disk idling gear 5, so that the opening element 32 is freely movable while turning back over nearly 360°, corresponding to one revolution of the recording disk idling gear 12, in the opposite direction, before the stop cam 33 is blocked by the shifting segment 36 pushed into its path of movement, and the clutch 13 is opened via the spring 14 as a result, so that the gear 10 will idle as well, without a tilting movement of the slat taking place. The gear 10 is blocked only when the closed blind position is left after turning back. If tilting is limited by the recording disk 29 being set (one revolution per side is now already missing), the clutch 13 is held by the recording disk 29 in the position in which the shifting segment 36 is pushed in the direction of rotation into a position in front of the stop cams 33, so that turning back is no longer possible.

To limit the tilting movement of the slats in intermediate positions to a tilt angle of smaller than 180°, as a result of which damage to or jamming of the slats due to mutual contact during the lateral travel movement is avoided, a slide 21 is movably guided in the direction of the lateral travel movement of the slat carriages under the recording disk idling gear 5, and is loaded by two springs 22 with a hollow contour against thickenings 23 of a the pull cord 6 designed as a bead chain. The slide 21 is laterally engaged by a lever 24, which is mounted movably around a vertical axis extending at right angles to the movement of the slide and acts, with its free end, via wedge surfaces 25, on another lever 26, which is guided vertically movably at right angles to the movement of the slide. The lever 26 carries a ratchet 27, which engages a recess 28 on the circumference of a the recording disk 29 of the second recording disk idling gear associated with the grooved shaft and is tensioned by a spring 30 on the lever 26 in the direction of meshing, so that movement of the slide 21 in the direction of the action of its spring 22 via the lever 24 causes an upward movement of the lever 26 against the action of the spring 30 in order to lift the ratchet 27 out of the recess 28. To achieve this movement, the thickenings 23, which would be located in the area of the slide 21 in the closed state of the blind, are removed from the pull cord 6, so that the slide 21 will perform a linear movement in the direction against the pull cord as a consequence of the action of its the spring 22 when the blind closed, as a result of which it disengages the ratchet 27 in the recording disk 29 via the levers 24 and 26 so that this recording disk gear is now able to perform six idle revolutions. It is achieved as a result that the full tilt angle of 180°, equaling six idle revolutions of the two recording disk idling gears 5 and 12, is possible only when the blind is closed, and the recording disk idling gear 12 is able to perform, in all intermediate positions, only four idle revolutions, which correspond to an opening angle of less than 180°.

The mode of operation of the gear will be described below on the basis of the graphic representation. During rotation of the driving element 1 to the right, its rotary movement is transmitted via the outer ring 4 of the planetary gear 2, 3, 4 to the drive gear 10 of the grooved shaft 11, because the bevel gear 7 is set by the ratchet 18 of the shifting segment 17. After six revolutions, the stop segments of the recording disk idling gears 5 and 12 will block, so that the spring 14 will be bent up, and the slip clutch 13 will thus be opened. At the same time, the stop elements of the recording disk idling gear 5 block, so that the disk 16 is displaced by the axial cam 15 in the axial direction against the action of the spring 20, and this disk will also change the axial position of the shifting segments 17 and 35, so that the ratchet 18 will release the bevel gear 7, and the shifting lever 36 will reach a holding position for the opening element 32 of the slip clutch 13. Since the driving element 1 is now nonrotatably connected to the outer ring 4 via the disk 16, the planet gears (planet gears) 3 are acted on the inside and outside in the same direction of rotation. Thus, the direction of rotation of the planetary gear and consequently the direction of rotation of the gear 10 for the drive of the grooved shaft will change. After one revolution, the shifting segment 36 opens the slip clutch 13, so that only the bevel gear 7 will be rotated, while the drive gear 10 for tilting the slats will run idle. At the time of reversal of the direction of rotation of the driving element 1, the disk 16 is pushed back into its starting position against a disk 38 under the action of the spring 20, as a result of which the shifting segment 17 is released, and the spring 34 with the ratchet 18 is pushed into the area of the recess 19 of the bevel gear 7, and blocks it. The disk 38 is rigidly connected to the outer ring 4 and serves only to support the spring 20. At the same time, the shifting segment 36 is pivoted out of the area of the slip clutch 13 via the shifting segment 35, as a result of which the bevel gear 7 will again be blocked, and the driving element of the slip clutch 13 will be released, so that the latter will again be closed by the action of the spring 20. Since the last recording disk is rigidly connected to the housing, the grooved shaft 11 is able to perform only a total of six revolutions, even if rotation in the reverse direction or a change in the direction of rotation had previously taken place on the driving element 1. If the bevel gear 8 is not in its end position, but in an intermediate position, in which the thickenings 23 on the pull cord 6 push the slide 21 to the rear against the action of its the spring 22, the ratchet 27 of the lever 26 will snap in a the recess 28 on the circumference of the recording disk 29, so that only four idle revolutions of the recording disk idling gear 12, with which only a tilt angle of less than 180° can be performed, are possible. It is only when the slide 21 is able to perform a linear movement under the action of its the spring 22 in the closed position of the blind, because no the thickenings 23 are in contact with its hollow contour, that the recording disk 29 of the recording disk idling gear 12 is released via the levers 24 and 26, so that the recording disk idling gear will be able to perform six full idle revolutions, which permit tilting the slats by 180°, so that the slats will be aligned in one plane.

What is claimed is:

1. A vertical blind driving arrangement including a tilt output for tilting slats around a vertical axis and a coupling to an endless pull cord for laterally displacing slat carriages, comprising:

a rotatable drive element connected to a central gear of a planetary gear, said planetary gear including an outer ring connected by a first recording disk idling gear to a drive gear, said first recording disk idling gear having an idle adjusted to a slat tilt angle of 180°, said drive gear for driving said pull cord;

an intermediate gear connected to said outer ring and connectable to a slip clutch, said slip clutch being connected to a grooved shaft providing said tilting output, said slip clutch being associated with a second recording disk idling gear for a slat tilt angle corresponding to 180°, said second recording disk idling gear opening, at the end of an idle path, said slip clutch, said first recording disk idling gear disengaging, at an end of its idle path, against the action of a spring, a movably guided shifting segment which blocks rotation of said drive gear.

2. A vertical blind according to claim 1, wherein:

said planetary gear and said first recording disk idle gear are accommodated, together with transmission elements in a housing having a cross section profile adapted to a support rail of said vertical blinds.

3. A vertical blind according to claim 2, wherein:

said slip clutch includes a first element and a second element which are coupled in a closing direction by a spring, said spring being provided between said grooved shaft and said second recording disk idling gear, and opening element of said slip clutch including recesses for engaging a shifting segment, said shifting segment being movably arranged between end positions for engaging said shifting element in one of said end positions.

4. A vertical blind according to claim 3, wherein:

said movably arranged shifting segment is mounted pivotable around an axis to abolish the coupling, said segment being actuated by axial movement of a shifting segment, which cooperates with an axial cam at an end plate of said first recording disk idling gear, said shifting segment being associated with the pull cord drive and with an axially displaceable disk.

5. A vertical blind according to claim 2, wherein:

blocking means are provided for blocking rotation of said grooved shaft for a tilting movement of said slats over a specified angle, on both sides of an extended flat plane outside the closed blind position or to bring tilting back to a flat plane when the closed blind position has been left.

6. A vertical blind according to claim 5, wherein:

said blocking means for eliminating the tilt angle includes a catch blocking a recording disk and a ratchet.

7. A vertical blind according to claim 6, wherein: said pull cord includes thickenings provided at spaced locations along said cord, said thickenings acting against a spring tension slide, said spring tension slide being coupled through transmission means to said ratchet, said pull cord including a region of no thickenings corresponding to a region which acts on said slide when the blind is closed, said slide releasing said ratchet in said closed position of the blind, said ratchet releasing said recording disk of said second recording disk idling gear associated with said grooved shaft, to allow 180° tilting of slats in said closed position.

* * * * *